June 18, 1963
A. M. BERTAO
3,094,099
FLOATING CLAW FOR MILKING MACHINES
Filed April 12, 1961
2 Sheets-Sheet 1
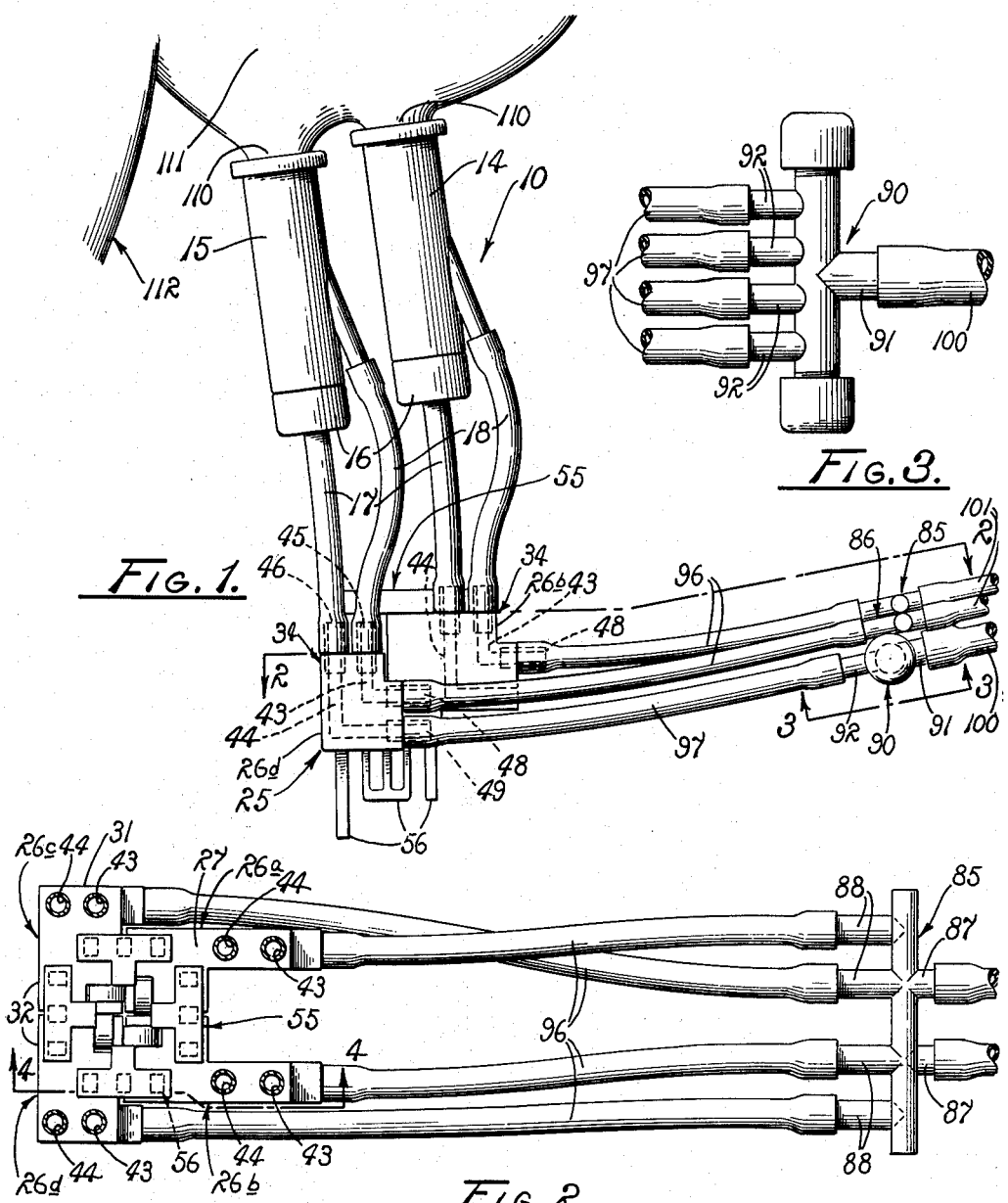
ANTONIO M. BERTAO
INVENTOR
HUEBNER & WORREL
ATTORNEYS
BY June 18, 1963
A. M. BERTAO
3,094,099
FLOATING CLAW FOR MILKING MACHINES
Filed April 12, 1961
2 Sheets-Sheet 2
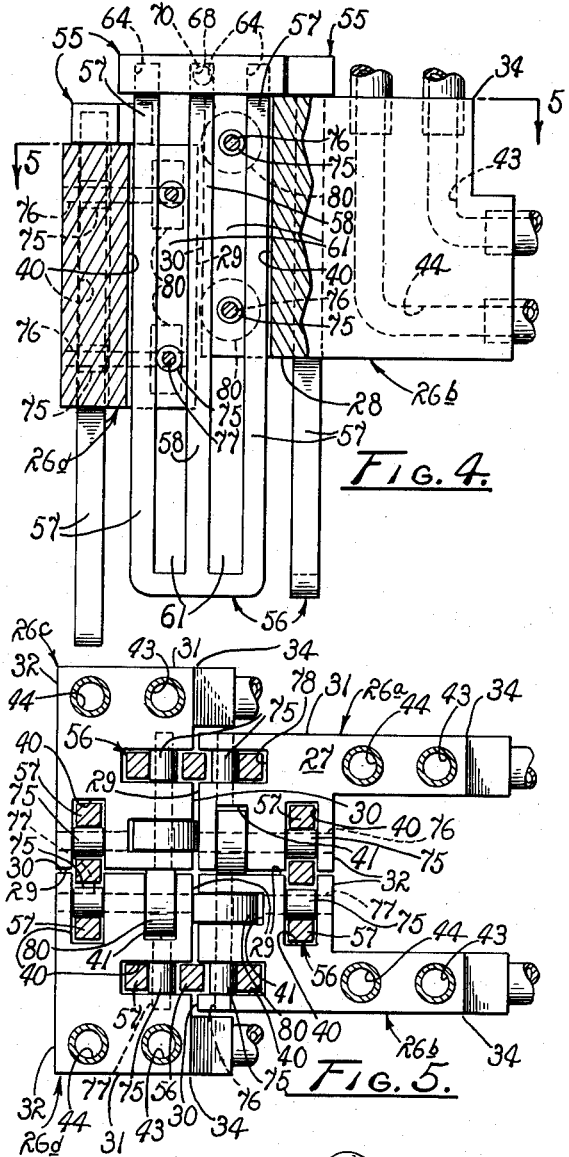
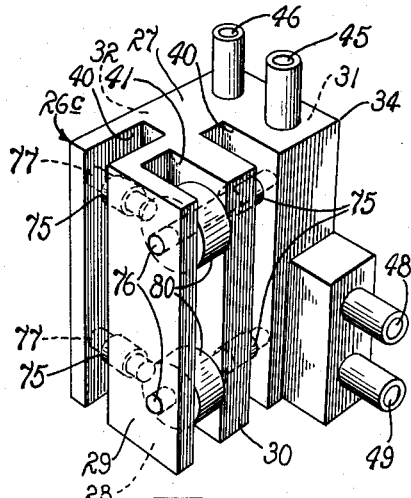
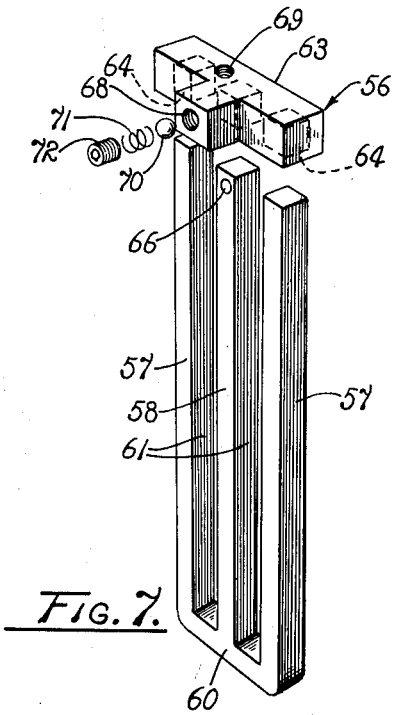
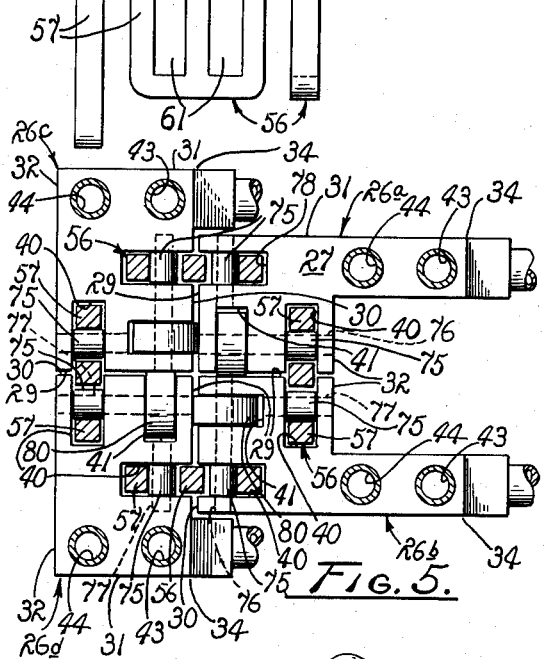
ANTONIO M. BERTAO
INVENTOR
HUEBNER & WORREL
ATTORNEYS
BY
Richard M. Worrel

United States Patent Office 3,094,099
Patented June 18, 1963

3,094,099
FLOATING CLAW FOR MILKING MACHINES
Antonio M. Bertao, Visalia, Calif., assignor, by mesne assignments, of fifty percent to Harold W. Jarvis, Tulare, Calif.
Filed Apr. 12, 1961, Ser. No. 102,507
10 Claims. (Cl. 119—14.54)

The present invention relates to a floating claw for milking machines and, more particularly, to such a claw for inter-connecting a plurality of teat cups in clustered assembly so that there is substantially equal distribution of weight on the teats of the animal during milking thereof.

Conventional milking machines include a plurality of teat cups for individual connection to the teats of a cow, a vacuum pump, a milk receiver, a control valve associated with the pump and receiver, a manifold and/or claw interconnecting the cups, and suitable milk and air lines or hoses interconnecting the manifold and/or claw, pump and receiver. Usually, each teat cup is connected by relatively short, individual, flexible milk and air lines to the claw. The claw is supported beneath the udder of a cow either by connection of the cups to the cow's teats or by an auxiliary support, such as a surcingle. Relatively long, flexible, common milk and air lines couple the claw in fluid communication with the valve and receiver.

Milking machines of this general description have been subject to certain difficulties which the present invention overcomes. For example, problems arise when the cups are attached to a cow having teats of different lengths and elevations relative to each other. With such a cow, the downward pull or tension on the teats is uneven and different weights and strains are imposed thereon. Usually, this imbalance produces teat irritation and milking inefficiency by drawing unequal amounts of milk from the various teats. Further, a milking machine is normally operated on each cow until all of its teats are milked substantially dry. However, if one or more teats are drained much in advance of the others by the described imbalance in milk withdrawal, continued milking action on the dry teats causes further irritation.

Accordingly, it is an object of the present invention to provide a floating claw for a milking machine.

Another object is to provide a milking machine claw which readily accommodates itself to individual differences in teats and udders of cows and other milking stock and which specifically adjusts to uneven teats of different lengths and elevations.

Another object is substantially equally to distribute weight imposed on an animal's teats during mechanical milking operations.

Another object is to alleviate pain, irritation and damage in and to the udder and teats of an animal incident to mechanical milking.

Another object is to increase the efficiency of milking machines.

Another object is to provide a milking machine claw which is easy to assemble and disassemble and which is convenient and easy to clean, maintain, and repair.

Another object is to provide such a claw which is simple, inexpensive, durable, and dependable in action.

These, together with other objects, will become more fully apparent upon reference to the following description and accompanying drawings.

In the drawings:

FIG. 1 is a fragmentary, side elevation of a portion of a milking machine attached to a cow which is fragmentarily illustrated and including a floating claw embodying the principles of the present invention.

FIG. 2 is a somewhat enlarged section taken on line 2—2 in FIG. 1.

FIG. 3 is a somewhat enlarged, fragmentary bottom plan view taken from a position indicated by line 3—3 in FIG. 1.

FIG. 4 is a still further enlarged, fragmentary, vertical section taken on line 4—4 in FIG. 2.

FIG. 5 is a fragmentary, horizontal section taken on a plane at a position represented by line 5—5 in FIG. 4.

FIG. 6 is a somewhat enlarged, perspective view of one of the blocks included in the claw of the subject invention.

FIG. 7 is a somewhat enlarged, disassembled perspective view of a fork incorporated in the claw of the subject invention.

FIG. 8 is a fragmentary, side elevation of the subject claw including a hook for enabling independent support of the claw.

Referring more particularly to the drawings, a portion of a milking machine is generally indicated by the numeral 10. The machine includes left and right, front teat cups 14 and left and right, rear teat cups 15. Each of the cups has opposite ends, and is provided with a conventional liner 16, a milk hose 17 endwardly axially extended from the cup, and an air hose 18 laterally and thence generally endwardly extended from the cup. The cups are elongated and concentrically circumscribe longitudinal axes therefor. Because the specific construction and operation of teat cups is known and constitutes no particular part of the subject invention, no further description of the cups is here provided.

A floating claw embodying the principles of the present invention is generally indicated by the numeral 25 in FIGS. 1 and 2. The claw includes left and right, front blocks 26a and 26b, and left and right, rear blocks 26c and 26d, as best illustrated in FIG. 6. Each block has substantially parallel top and bottom walls 27 and 28, right-angularly related inner side walls 29 and 30, and outer side walls 31 and 32 in right-angular relationship to each other. Each block also provides a conductor portion 34 forwardly extended from the outer side walls 32 of the front blocks and from the inner side walls 30 of the rear blocks, all as best illustrated in FIGS. 2 and 5.

Each block 26a, 26b, 26c and 26d has a pair of elongated, right-angularly related, U-shaped, receiving channels 40 opening endwardly through the top and bottom walls 27 and 28 and laterally through the inner side walls 29 and 30. Further, each block provides an elongated, U-shaped roller channel 41 which likewise opens endwardly through the top and bottom walls and laterally through the inner side walls 30. It is to be noted that the channels in each block which open outwardly of the same side wall are substantially parallel to each other. Additionally, the conductor portions 34 are provided with elongated air and milk passages 43 and 44 terminating in upper cup ports 45 and 46 and lower manifold ports 48 and 49.

The blocks 26a, 26b, 26c and 26d are assembled in interfitted, generally rectangular relation, as best illustrated in FIG. 5, with the outer side walls 31 substantially parallel to each other, with the outer side walls 32 of the front blocks in a substantially common plane, and with the outer side walls 32 of the rear blocks in a substantially common plane with each other, said latter plane being substantially parallel to the common plane of the outer side walls of the front blocks. That is, the blocks are assembled so that the inner side walls 29 and 30 of adjacent blocks are in opposed, substantially parallel spaced relation, so that the receiving channels 40 of adjacent blocks are in longitudinally opposed registration, and so that an inner side wall of each block is opposed to a roller channel 41 of its adjacent block. Further, it is to be noted that the conductor portions 34 of the rear blocks extend forwardly in laterally, outwardly, closely spaced relation to the outer side walls 31 of the front blocks.

The subject claw 25 also includes a carrier, generally indicated by the numeral 55, for the blocks 26a, 26b, 26c and 26d. The carrier provides a plurality of elongated, rigid, forked track member 56 individually best illustrated in FIG. 7. Each fork provides a pair of elongated outer rails 57 and an intermediate rail 58 all of substantially square cross-section and having upper and lower ends. A lower base member 60 rigidly interconnects the rails in substantially equally spaced relation to each other so that elongated slots 61 are provided between adjacent rails.

The rails 57 and 58 of each track 56 are adapted to be upwardly extended through registering receiving channels 40 in a pair of adjacent blocks, as 26c and 26d, for example. With the base member 60 located below the bottom walls 28 of its associated blocks, the rails are long enough to extend upwardly from the top walls 27 of the blocks. Each track provides a cap member 63 including outer and intermediate sockets 64 individually, releasably receiving the rails. The cap members are adapted to engage the top walls of adjacent blocks, as illustrated in FIG. 4. Each intermediate rail has a detent indentation 65 located within its respective intermediate socket of the cap member and in alignment with an aperture 68 in such cap member. It is also to be noted that each cap member provides an upwardly opening bore 69. A detent 70 is yieldably urged into the indentation by means of a compression spring 71 positioned in the aperture and held under compression by a plug 72 screw-threadably connected to the cap member in said aperture.

A pair of connecting rollers 75 is positioned in each receiving channel 40 in spaced relation to each other longitudinally of their respective channel. The rollers are journaled in their respective blocks 26a, 26b, 26c and 26d by long and short pins 76 and 77 extended transversely of their respective channels in inwardly spaced, substantially parallel relation to the inner side walls 29 and 30 through which their respective channels 40 open. The connecting rollers are peripherally spaced from their adjacent inner side walls and from back walls 78 of their respective channels. It is to be noted that the long pins are individually axially extended through the roller channels 41 in their respective blocks. Guide rollers 80, diametrically larger than the connecting rollers, are individually rotatably mounted on the long pins in each block, positioned in the roller channels, and peripherally outwardly extended from the inner side walls 29 and 30 through which their respective roller channels open.

With the tracks 56 located in the registering receiving channels 40, as described above, the connecting rollers 75 are located in the slots 61 of their associated tracks for rollable engagement against the rails 57 and 58. Further, the base members 60 are adapted to engage the lower connecting rollers in corresponding channels incident to relative movement of the blocks 26a, 26b, 26c and 26d downwardly on the rails. Therefore, the tracks constituting the carrier 55 releasably interconnect the blocks in the described interfitted relation. Still further, the guide rollers rollably engage the inner side walls 29 of adjacent blocks. In this manner, the blocks are individually mounted on the carrier for freely slidable, independent movement longitudinally of the rails.

The carrier 55 is optionally provided with a hanger 81, as illustrated in FIG. 8, for interconnecting the tracks 56. The hanger includes a plate 82 positioned in overlying relation against the cap members 63 and releasably secured to these members by bolts 83 screw-threadably received in the bores 69. A hook 84 includes a shank rigidly connected centrally to the plate and in upstanding relation therefrom. Preferably, the shank includes a pair of sections releasably, telescopically interconnected as by a bayonet-type joint.

Upper and lower air manifolds 85 and 86 are illustrated in FIGS. 1, 2 and 3. Each manifold provides a common nipple 87 and a pair of branch nipples 88. A milk manifold 90 includes a common nipple 91 and four branch nipples 92. Preferably, the three manifolds are connected in a stacked relation, as by welding, and as is evident in FIG. 1.

Elongated flexible, preferably rubber or plastic air ducts 96 individually interconnect the branch nipples 88 of the air manifolds 85 and 86 and the manifold ports 48 of the blocks 26a, 26b, 26c and 26d. More specifically, the manifold ports 48 of diagonally related left front and right rear blocks 26a and 26d are connected to the upper manifold 85 while the manifold ports 48 of diagonally related right front and left rear blocks 26b and 26c are connected to the branch nipples of the lower manifold 86. Flexible milk ducts 97 individually interconnect the manifold ports 49 of the blocks and the branch nipples 92 of the milk manifold 90.

In addition, a main milk line 100 is connected to the common nipple 91 of the milk manifold 90, and main air lines 101 are respectively connected to the common nipples 87 of the air manifolds 85 and 86. As is well-known in the art, during operation of the milking machine 10, the air lines are alternately subjected to pressure and vacuum while vacuum is continuously applied to the milk line. Also, the latter is adapted for connection to a milk receiver or container, not shown.

*Operation*

The operation of the present invention is believed to be readily apparent and is briefly summarized at this point. With continuous vacuum applied to the milk line 100, the teat cups 14 and 15 are respectively connected to the left front and rear and right front and rear teats 110 of the udder 111 of a cow, a portion of which is indicated in outline and designated by the numeral 112 in FIG. 1. As is well-known, teat length and relative teat elevation on a particular cow may vary. As an example of this characteristic, it is to be noted in FIG. 1 that the front teats are illustrated as being higher on the udder than the rear teats.

The carrier 55 is supported beneath the udder 111 by virtue of its connection to the teat cups 14 and 15 which are attached to the teats 110 by suction. The carrier 55 is supported on the cow's back, not shown, by utilizing the hanger 81 and extending a surcingle, not shown, through the hook 84 and over the back of the cow, or, if the hanger is employed, the carrier may be supported by independent means, not shown, extended under the cow as, for example, by an arm or pole.

It is to be noted in FIG. 1 that the rear blocks 26c and 26d are downwardly displaced from the front blocks 26a and 26b relative to the carrier 55. This is because of the variation in elevation of the front and rear teat cups as attached to the teats of the cow 112. In fact, the blocks ride or float elevationally freely on their respective tracks 56 of the carrier. Because the blocks and their associated cups, hoses 17 and 18, and ducts 96 and 97 are of substantially uniform weight, the subject claw distributes weight substantially equally on all of the teats regardless of their location elevationally within the limits of movement of the blocks on the carrier. Stated otherwise, no one teat bears appreciably more than its share of the total weight. In this manner, milking action is balanced on all of the teats resulting in greatly increased milking efficiency. Also, this equal weight distribution alleviates pain, irritation, and damage in and to the udder and teats of the animal incident to milking.

It is also to be noted that during operation of the milking machine 10, air pressure or vacuum is simultaneously applied to diagonally related teat cups 14 and 15. That is, the left front and right rear cups have pressure simultaneously applied thereto while vacuum is applied to the right front and left rear cups, and vice versa. It has been determined that this action also improves milking efficiency.

From the foregoing, it will be evident that a floating claw for a milking machine has been provided. Essentially, this claw substantially equally distributes weight on the animal's teats during milking by the milking machine. The claw readily accommodates itself to teats and udders of various cows and other milking stock and compensates for uneven teats of different lengths and elevations. In actual practice, efficiency of operation of a milking machine employing the subject claw is considerably increased.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a machine for milking an animal having an udder providing downwardly extended teats, which machine includes cups adapted to be fitted individually on the teats of the animal; a carrier including blocks individually mounted on the carrier for independent, elevational free floating rectilinear movement, fluid conducting means individually interconnecting the blocks and the cups and individually supporting the blocks on their respective cups whereby weight on the teats is substantially equalized, and manifold means connected to the blocks adapted to receive milk therefrom.

2. In a milking machine including elongated teat cups having opposite ends and circumscribing individual longitudinally extended axes, hoses connected to and generally individually extended from the cups, and ducts adapted for connection to a pneumatic source and to a milk receiver; a claw comprising blocks individually corresponding in number to the number of teat cups and providing fluid conducting passages terminating in cup ports respectively connected to the hoses associated with their corresponding cups and opposite ports individually connected to the ducts, the blocks being of substantially equal weight; and means interconnecting the blocks in side-by-side relation for independent movement relative to each other along paths individually substantially axially aligned with their corresponding cups whereby with the cups attached to the teats of an animal being milked, the blocks adjust elevationally relative to each other in accordance with the relative elevations of their associated cups to impose substantially equal weights on the teats.

3. In a machine for milking an animal having dependent teats, the milking machine including teat cups adapted to be connected to such teats by suction, fluid conduits connected to the cups and adapted to hang downwardly therefrom when the cups are connected to the teats, and main fluid lines adapted for connection to a pneumatic source and to a milk receptacle; a floating claw for the machine comprising a carrier including a plurality of elongated rails interconnected in side-by-side, substantially parallel, spaced relation; a plurality of weighted members corresponding in number to the number of teat cups having substantially equal weight, being individually longitudinally slidably mounted on the rails in longitudinally aligned relation with their respective teat cups and having fluid conducting passages individually connected to the fluid conduits associated with their corresponding teat cups; and a fluid conducting means interconnecting the passages in the weighted members and the main fluid lines whereby during milking of the animal, the weighted members are free to move independently of each other upwardly and downwardly on their respective rails so as to impose substantially equal amounts of weight on the teats.

4. The claw of claim 2 wherein the blocks have opposed, substantially parallel side walls and elongated channels recessed in the blocks from said side walls and being in opposed, longitudinal registration when the blocks are in said side-by-side relation, each channel having a back wall inwardly spaced from its respective side wall, wherein connecting rollers are positioned in the channels and journaled in the blocks for rotation about axes extended transversely of the channels in substantially parallel relation to each other and to said side and back walls, the rollers having peripheral surfaces spaced from the side and back walls of their respective blocks; and the interconnecting means being an elongated forked track having elongated, spaced, parallel, rigidly interconnected rails individually extended into the channels of the blocks between the rollers and between said back walls and adjacent rollers whereby the blocks are longitudinally slidable on the rails.

5. The claw of claim 4 wherein the rails have predetermined upper and lower ends, wherein a base member rigidly interconnects said lower ends, and wherein a cap member is releasably connected to the upper ends of the rails.

6. The claw of claim 2 wherein the blocks have opposed, substantially parallel side walls, and wherein rollers are journaled in one of the blocks and rollably engage the other block during said relative movement of the blocks for guiding and facilitating such movement.

7. The machine of claim 3 wherein the carrier includes a hanger connected to the rails and upwardly extended from the rails when the cups are attached to the teats of an animal whereby the carrier is adapted to be supported independently of the animal's teats.

8. In a machine for milking an animal having an udder providing downwardly extended teats and including cups adapted to be fitted individually on the teats, flexible air and milk hoses individually connected to the cups, air and milk manifolds respectively adapted for connection to a pneumatic source and to a milk receiver, and flexible air and milk ducts respectively connected to the manifolds; a floating claw for substantially equalizing imposition of weight on the cow's teats during milking thereof comprising a plurality of blocks corresponding in number to the number of cups and being of substantially uniform weight, each of the blocks having top and bottom walls, right-angularly related, inner side walls, right-angularly related, outer side walls, elongated fork-receiving channels endwardly opening through the top and bottom walls and laterally opening through the inner side walls, an elongated roller channel opening endwardly through the top and bottom walls and laterally through one of the inner side walls, and air and milk passages having upper cup ports individually connected to corresponding hoses of the cups and lower manifold ports individually connected to the air and milk ducts, respectively, the blocks being assembled in generally rectangular relationship with the inner side walls of adjacent blocks being in opposed, adjacent spaced relation, with the receiving channels of adjacent blocks being in registration, and with an inner side wall of each block being opposed to the roller channel of an adjacent block; a carrier including a plurality of forks, each fork having outer and intermediate legs extended through said registering channels of an adjacent pair of blocks and providing elongated slots therebetween, the legs having upper and lower ends respectively adjacent to the top and bottom walls of the blocks, a base member rigidly interconnecting the lower ends of the legs of each fork, a cap member releasably connected to the upper ends of the legs of each fork above the top walls of the blocks; connecting rollers positioned in the receiving channels of the blocks and the slots of the forks and being journaled in the blocks for rotation about axes extended transversely of their associated forks and substantially parallel to the inner side walls through which their associated channels open whereby the blocks are individually mounted on the forks for independent, elevationally freely floating movement; and guide rollers positioned in the roller channels of the blocks and journaled therein for rotation about axes substantially parallel to the inner side walls through which their associated channels open, the guide rollers being peripherally outwardly extended from their respective channels into rollable engagement with the opposed side walls of their adjacent blocks.

9. The machine of claim 3 wherein said fluid conducting means includes a pair of manifolds each having a common nipple respectively connected to the main fluid lines, and a plurality of branch nipples; and ducts interconnecting the branch nipples and the passages in the weighted members.

10. In a machine for milking an animal having dependent front and rear pairs of left and right teats, the milking machine including elongated teat cups circumscribing longitudinal axes and adapted to be connected individually to such teats by suction, fluid conduits connected to the cups and adapted to hang downwardly therefrom when the cups and connected to the teats, a pair of main air lines adapted for connection to a source of alternating pressure and suction, and a main milk line adapted to be connected to a milk receptacle; a claw for minimizing teat irritation and improving efficiency of the milking machine comprising front and rear pairs of left and right blocks corresponding to the teat cups, each block providing a pair of fluid conducting passages terminating in cup ports respectively connected to the fluid conduits associated with their corresponding cups, and opposite manifold ports, the blocks being of substantially equal weight and of generally right-rectangular cross-section having predetermined inner and outer side walls; means interconnecting the blocks in generally right-rectangular formation with their inner walls in adjacent opposed relation and so that the front and rear pairs of left and right blocks are respectively positioned below corresponding teats of the animal when the cups are connected to such teats, said means further interconnecting the blocks for individual movement relative to each other along paths substantially axially aligned with their corresponding cups whereby the blocks are free for elevational floating movement when the cups are attached to the animal's teats; a milk manifold having a common nipple connected to the main milk line and a plurality of branch nipples; ducts individually interconnecting the branch nipples of the milk manifold and a manifold port in each of the blocks; a pair of air manifolds each having a common nipple individually connected to the main air lines and a pair of branch nipples; ducts individually interconnecting the branch nipples of one of the air manifolds and manifold ports in the left front and right rear blocks; and ducts individually interconnecting the branch nipples of the other air manifold and manifold ports in the right front and left rear blocks whereby, during operation of the milking machine, pressure and vacuum are alternately and simultaneously applied to diagonally related teats of the animal and whereby weight is substantially equally distributed on the teats.

References Cited in the file of this patent
UNITED STATES PATENTS

| | | |
|---|---|---|
| 1,478,802 | Stampen | Dec. 25, 1923 |
| 2,812,742 | Millar | Nov. 12, 1957 |